United States Patent [19]

Brunelle et al.

[11] Patent Number: 4,697,232
[45] Date of Patent: Sep. 29, 1987

[54] I/O DEVICE RECONNECTION IN A MULTIPLE-CPU, DYNAMIC PATH ALLOCATION ENVIRONMENT

[75] Inventors: Philip E. Brunelle; Bob R. Southerland, both of Boulder County, Colo.

[73] Assignee: Storage Technology Corporation, Louisville, Colo.

[21] Appl. No.: 676,707

[22] Filed: Nov. 30, 1984

[51] Int. Cl.⁴ .............................................. G06F 13/14
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,189,769 | 2/1980 | Cook et al. | 364/200 |
| 4,207,609 | 6/1980 | Luiz et al. | 364/200 |
| 4,314,334 | 2/1982 | Daughton et al. | 364/200 |
| 4,413,317 | 11/1983 | Swenson | 364/200 |
| 4,476,526 | 10/1984 | Dodd | 364/200 |
| 4,484,275 | 11/1984 | Katzman et al. | 364/200 |

Primary Examiner—Archie E. Williams, Jr.
Assistant Examiner—Michael J. Ure
Attorney, Agent, or Firm—Woodcock Washburn Kurtz Mackiewicz & Norris

[57] ABSTRACT

In a multiple-CPU, dynamic path allocation environment. The environment, several devices, such as input-/output (I/O) devices, may be accessed through one of a plurality of dynamically configured paths from the CPU. Each path includes a channel, from the CPU, connected to a director. The director, in turn, is connected through respective control module interfaces, to a plurality of control modules, which control modules are used to access a string of devices. The connection method, carried out under control of the director, includes simultaneously polling all of the control modules to determine if any have devices attached thereto that are ready to be connected to the CPU. A response from the control modules, all received simultaneously at the director, identifies the CPU channel through which the connection is to be made. The specific address of the device to be connected is then determined, and the desired connection from the CPU to the device is completed.

5 Claims, 8 Drawing Figures

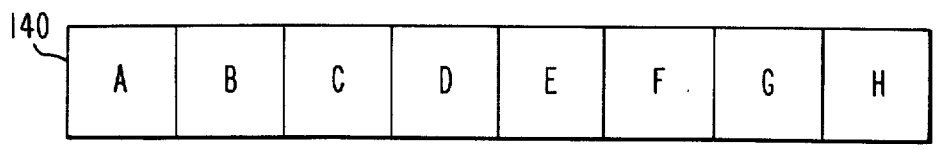
_Fig.3_
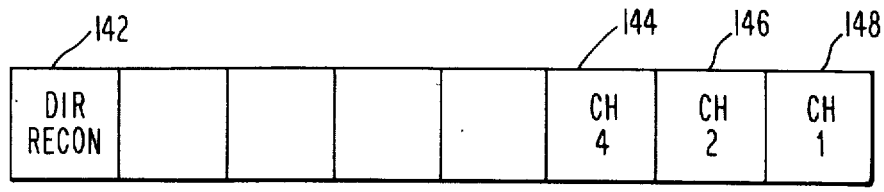
_Fig.4A_
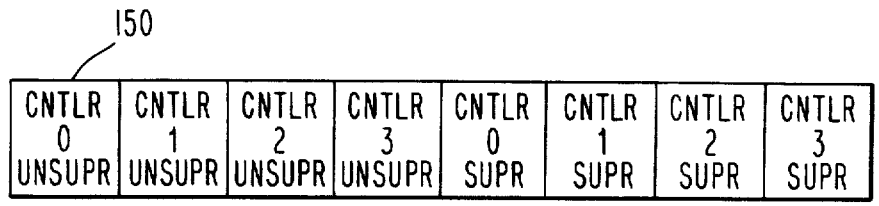
_Fig.4B_
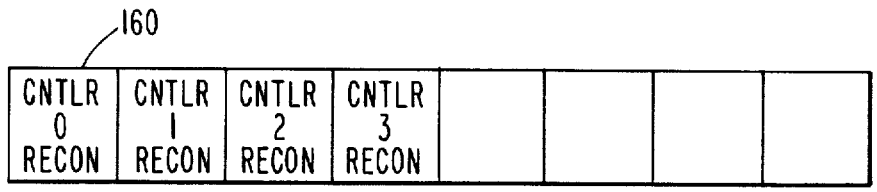
_Fig.5_
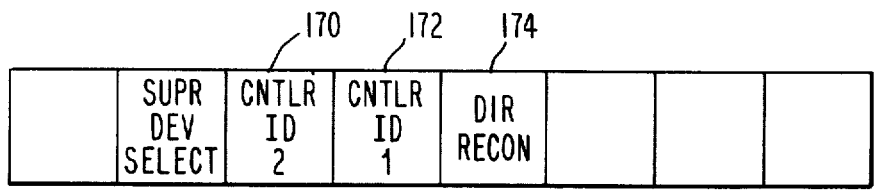
_Fig.6A_
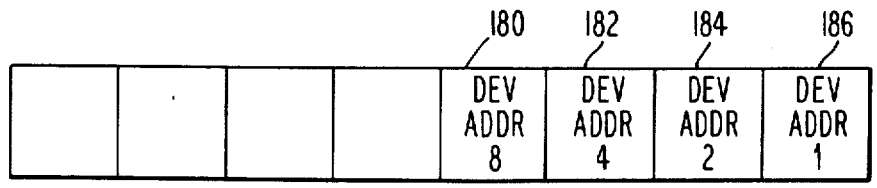
_Fig.6B_

I/O DEVICE RECONNECTION IN A MULTIPLE-CPU, DYNAMIC PATH ALLOCATION ENVIRONMENT

BACKGROUND OF THE INVENTION

This invention relates to a method and apparatus for the path independent reservation and reconnection of devices by CPU's operating in a multiple-CPU, dynamic path allocation, and shared device access system environment. More particularly, this invention relates to a system for reconnecting a device to a CPU after the device has been disconnected from the CPU and completed an operation.

A disk data storage subsystem attached to a large mainframe central processing unit (CPU) of the type manufactured by the IBM Corporation, and other manufacturers, consists of one or more directors, one or more control modules, and one or more disk storage devices. The CPU is attached to one or more of the directors through a system of electronics and cables called a channel. The directors are attached to control modules through a control module interface and the control modules are attached to the devices through a device interface. For the CPU to store or retrieve data on a disk data storage device, it first sends commands to the director and the director sends commands to the control module which actually controls the disk data storage device. Data being written passes from the CPU, over the channel, through the director, through the control module and is written onto the device. Data being read comes from the device, through the control module, through the director, through the channel and into the CPU. The combination of a particular channel, director and control module is called a path.

To improve performance of a disk subsystem, a function known as dynamic pathing, described in Luiz et al., U.S. Pat. No. 4,207,609, is used to allow a CPU to initiate an operation on a given device through one set of a channel, director and control module (a path), and complete the operation at a later time through a second set of a channel, director and control module (a second path). As pointed out by Luiz et al., mechanical operations on a disk data storage device, such as moving the head arm from one location on the disk device to another, do not require that the device remain connected to the CPU. The CPU initiates a seek command to cause the disk head arm to move from one cylinder to another and the CPU disconnects from the device while the mechanical arm movement is in process. After the completion of the seek, the disk must be reconnected to the CPU that started the seek in order to notify the CPU that the seek has been completed so that the CPU can perform a read or write operation at the new location on the disk.

In a dynamic pathing system, the CPU can initiate such a seek command, through a first path including a particular channel, director and control module combination, and when the device has completed the seek, it can be reconnected to the CPU through a second path including a different combination of channel, director and control module. In systems prior to dynamic pathing, the disk would have to be reconnected to the CPU through the exact same path, therefore, if the particular path was busy at the time the device finished its seek operation, the device had to wait util the path was free, thus wasting time. With dynamic pathing, should the path be busy, the device can reconnect through a second path, thus improving the overall performance of the system.

If a device is unable to reconnect to the CPU to complete a seek command, a performance degradation occurs until the reconnection can be made. However, once the reconnection is made, no further degradation occurs. Other commands have a time window within which to reconnect, and if the time window is missed, additional delay occurs. One such command is rotational position sense (RPS). The RPS command tells the disk subsystem to disconnect from the CPU and search for a particular location on a data track which is rotating under the read/write head of a disk device. When the disk device rotates to the proper location, it reconnects to the CPU so that data can be read or written from the location. If a reconnection cannot be performed within a certain time window, the read/write location moves past the read/write head and is lost until it makes another revolution. The time required for an extra revolution is a very significant amount of time in a large mainframe computer system, so any improvement in the ability to reconnect is very important.

In the prior art dynamic pathing systems, after the CPU has initiated an operation such as a seek or RPS on the disk device, the director enters a polling loop wherein it communicates, one at a time, with each control module attached to the director to determine if that control module has any device that has completed a disconnected operation. When one of the control modules responds to the director that one of the devices attached to the control module has completed a disconnected operation, the director then polls the control module to determine the particular device address of the device needing to be reconnected to the CPU. After obtaining the device address, the director uses an internal table to determine which of the channels attached to the director can be used to reconnect the device to the CPU. The director then requests service from the channel, and after receiving an acknowledgment of the service request, the director sends the device address to the CPU, thus completing the connection between the disk storage device and the CPU. In present systems, the time required to complete the polling sequence is a limiting factor into the total number of disk storage devices and controllers which can be connected to a particular director since, if too many devices are attached, the polling loop will be long enough to miss the time window of commands such as RPS. That is, since each control module is polled separately, as more control modules are added to the system, more time is required to complete the polling loop, and should the polling loop time exceed the time window of a given command, the command to that device would fail. In order to prevent failures due to the polling time, the total number of control units on a given subsystem must be limited.

There is need in the art then for a polling system which reduces the time necessary to poll all the control modules from a given director to improve the percentage of reconnects made on the first attempt and also to allow more devices to be attached to each director.

SUMMARY OF THE INVENTION

It is an object of the present invention to provide a more efficient method for reconnecting a device, such as an I/O device, to a CPU operating in a multiple- CPU, dynamic path allocation, and shared device access system environment.

It is another object of the present invention to provide such a method for device reconnection that is controlled by a director placed between the channels of the CPU and the control modules, the control modules being coupled to the devices to be reconnected.

A further object of the present invention is to provide such a method for device reconnection that allows the director to simultaneously interrogate all of the control modules attached thereto in a single block poll, to determine which devices are ready for device reconnection, rather than having to individually interrogate each control module as has been common in the prior art, thereby decreasing polling time and increasing the number of devices that may be attached to each director.

The above and other object and features of the present invention are realized using a specific reconnection method in a multiple-CPU dynamic path allocation environment wherein multiple devices, such as I/O devices, are shared between the multiple CPU's. As explained previously, each CPU has multiple channels through which an external device may gain access to the CPU. A director is attached to each channel. Each director is coupled to a plurality of control modules through respective control module interfaces. The devices are connected to a control module through a device interface. When the CPU desires that some operation be performed by the external device, such as to seek to a certain block of data, the device performs the seek operation independent of further control by the CPU, thereby freeing up the CPU to perform other tasks. Once the device operation is completed, the device must be reconnected to the CPU through a path that includes a selected control module, a control module interface, a selected director, and a specified channel. The present invention advantageously provides an efficient method of making this device connection to the CPU. The method includes the steps of:

(1) sending to the control module a device connect read signal from all I/O devices ready for connection to the CPU;

(2) simultaneously polling all control modules to determine if any control modules have I/O devices ready for connection, this polling being carried out by at least one of the directors;

(3) simultaneously receiving at the polling director a response to the poll of step (2), this response not only identifying which control modules have I/O devices ready for connection to the CPU, but also identifying the specific channel of the CPU through which the desired connection is to be made;

(4) individually interrogating each of the control modules identified in step (3) to determine a specific device address to which the desired connection is to be made, this interrogation being carried out under control of the director; and (5) connecting the device at the specified device address to the CPU through the specified channel, this connection also being carried out under control of the director.

BRIEF DESCRIPTION OF THE DRAWINGS

FIG. 3 shows the channel bits that result from a poll from the director to a control module;

FIGS. 4a and 4b define the data bits sent from the director to a control module and from a control module back to the director respectively for a poll for response to channel;

FIG. 5 shows the bits return from the controllers in a poll for director only connection; and FIGS. 6a and 6b define the data bits sent to a controller and from a controller respectively in a select controller and poll for device address.

DETAILED DESCRIPTION OF THE INVENTION

The following is a description of the best presently contemplated mode of carrying out the present invention. This description is given only to illustrate the general principals of the invention and is not to be taken in a limiting sense. The true scope of the invention can be ascertained by reading the appended claims.

Figure 1:
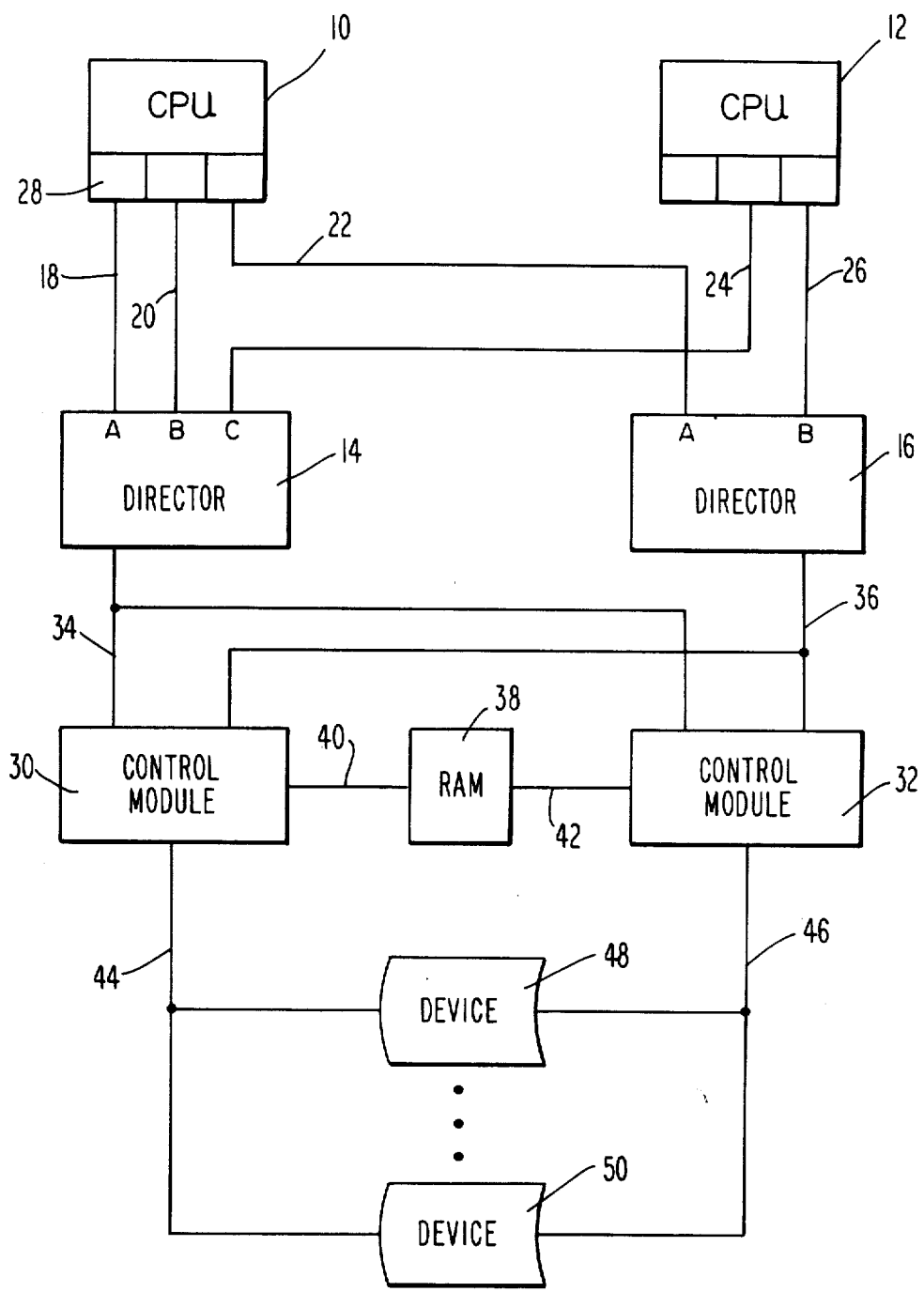
FIG. 1 shows multiple CPU's accessing a shared disk data storage subsystem incorporating dynamic pathing.

FIG. 1 shows a multi-CPU and shared disk data system configuration which includes the present invention. Two CPU's, 10 and 12 are suitably cross connected to a pair of directors 14 and 16, through channels 18, 20, 22, 24, and 26. CPU 10 connects to director 14 through channels 18 and 20 and connects to director 16 through channel 22. CPU 12 connects to director 14 through channel 24 and connects to director 16 through channel 26. The channels 18, 20, 22, 24 and 26 include electronic circuitry 28 as well as a physical electrical cable connecting the CPU to a director. Director 14 has three channels terminating respectively in ports A, B, and C, and director 16 has two channels terminating in ports A and B. Director 14 is connected to control module 30 through a control module interface 34. Director 16 is connected to control module 32 through a control module interface 36. Control module 30 is connected to up to sixteen devices, indicated here by device 48 and device 50, through a device interface 44. Control module 32 is also connected to up to sixteen devices, again indicated here by device 48 and device 50, through a device interface 46. Control module 30 connects to the random access memory (RAM) 38 through interface 40 and control module 32 connects to the RAM 38 through interface 42. The RAM 38 allows dynamic pathing and is more fully described in Luiz, et al., U.S. Pat. No. 4,207,609.

The control module interfaces 34 and 36 are identical and consist of a bus-out including eight data bits from the director to the control module, a bus-in including eight data bits from the control module to the director, and a series of command lines for passing a command from the director to the control module. The buss-in lines from the control module to the director are constructed such that more than one control module could put information onto these lines, and the result is a logical OR of the data. Since this databuss logically OR's data from more than one control module, the director is able to poll all the control modules at one time rather than having to poll each individually.

After the CPU has initiated operations, such as an RPS or seek, to disk devices, the devices disconnect from the CPU. While the devices are performing the operation, the director must poll all of the control modules to determine if any device has completed an operation so that the device can be reconnected to the CPU to notify the CPU that the operation is complete. Hardware resident in the control module maintains status information that allows the control module to categorize the reconnection or service status of each device.

There are five possible states for a given device as follows:
1. No reconnection or service required.
2. Unsuppressible reconnection to one or more channels required.
3. Suppressible reconnection to one or more channels required.
4. Special case reconnection to director only, no channel required.
5. Device requires immediate service by the control module.

An unsuppressible reconnection is needed where the device has completed some operation which was started by the CPU, therefore, the device must notify the CPU and the reconnection request cannot be suppressed. A suppressible reconnection can occur where the device has as been placed into a ready status by the person operating the computer system, and there is no immediate time requirement to be satisfied, therefore, this request can be suppressed until the system is free of all other higher priority activity, at which time the request is honored and the CPU is notified that the device is now in a ready status. Both of the reconnection requests, whether unsuppressible or suppressible, may be thought of as a "device connect ready signal" that alerts the control module to the fact that there is a device that needs to be reconnected.

Figure 2:
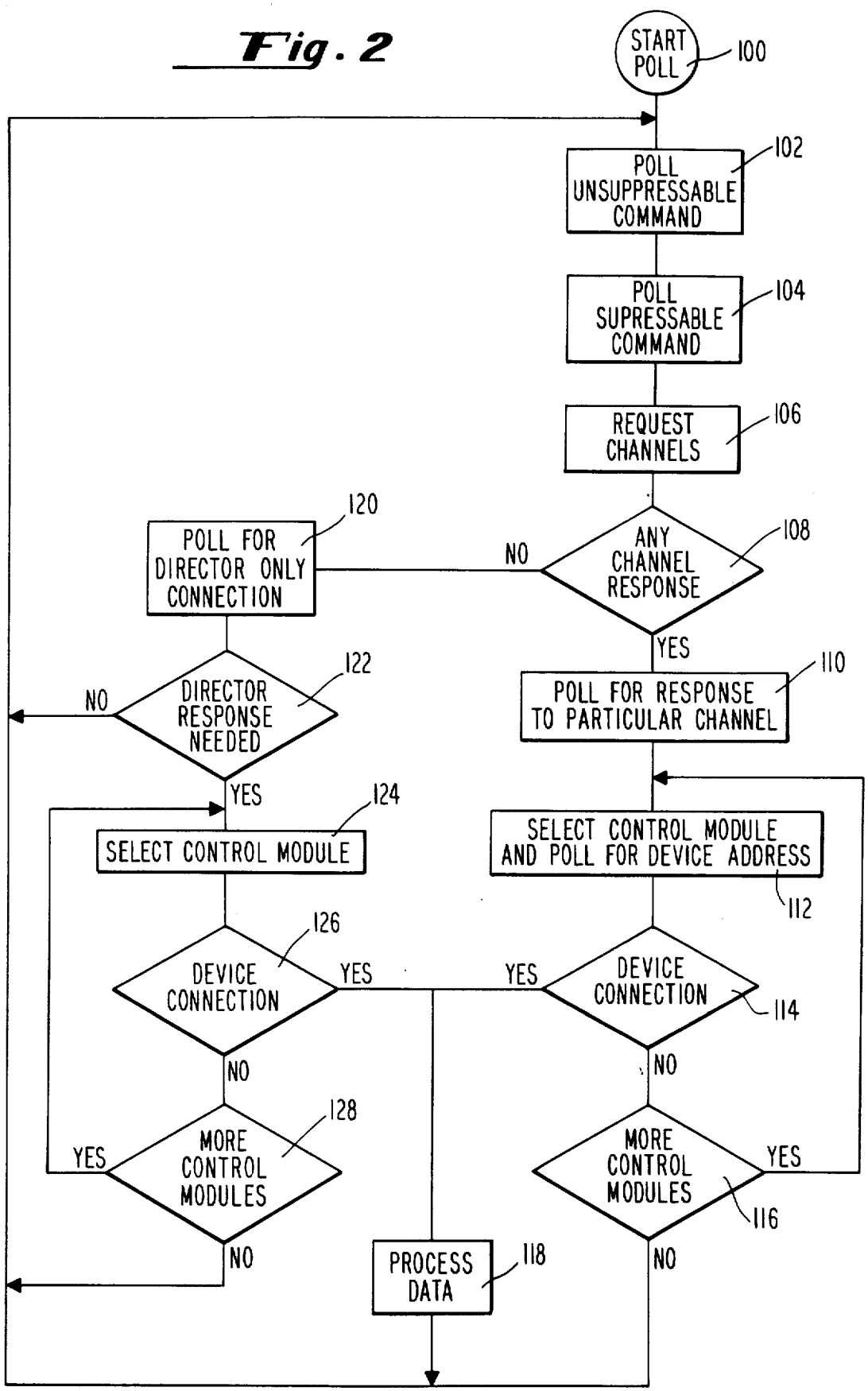
FIG. 2 is a flow diagram of the present invention.

FIG. 2 shows the poll and reconnect sequence which is performed by the director in the present invention. The poll reconnection sequence is begun at block 100. The director invokes a poll unsuppressible command at block 102 to request that the control modules identify those channels that need to be reconnected to a device to complete a command that is unsuppressible. The poll suppressible command at 104 performs the same function to identify those devices that need connection to the CPU to identify the completion of a suppressible operation.

FIG. 3 shows the bits of the data on buss-in from the control module to the director that identifies the channels needing service. Bit A, for example, would identify that one of the control modules polled needs to be connected to port A of the director which is connected to one of the channels of the CPU. It is possible that more than one controller needs service from the channel attached to port A and so a bit set to one in the A position of FIG. 3 indicates that at least one control module needs to be reconnected to the channel attached to port A. Since a director can be attached to up to eight channels through eight different ports, the eight bits, A through H, of FIG. 3 can identify any or all of the channels needing to be reconnected.

If one or more of the bits on buss-in from the control modules to the director is set, indicating that a channel is needed, the director will request the proper channel at block 106 in FIG. 2. The details of how the director requests service from a channel is described in IBM publication GA22-6974 entitled "IBM System/360 and System/370 I/O Interface Channel to Control Unit Original Equipment Manufacturers' Information". These details are not significant to the description of the present invention. At block 108 of FIG. 2, the director decides whether one or more of the channels requested have responded. If one of the channels has responded, the director must determine which of the control modules needs to be reconnected to this particular channel. Since the poll unsuppressible command at block 102 and the poll suppressible command at block 104 determined only that some control module needed reconnection to the channel, the director now must poll all the control modules to determine which ones need reconnection to the particular channel. At block 110 the director issues a poll for response to channel command and places on buss-out information as defined in FIG. 4A. Since this poll is to determine which control modules need access to a channel, the DIR RECON bit 142 will be set to zero and the channel bits 144, 146 and 148 will be set to indicate the binary value of the responding channel. Since three bits are used to identify the channel, the values 0 through 7 can be used to indicate one of the eight channels connected to the director. The response from the control modules to the poll for response to channel command of block 110 is shown in FIG. 4B. Since only four control modules can be attached to a given director, the eight data bits for data transferred between the control module and the director can be used to allow each of the four control modules to identify both the unsuppressible and suppressible requests. For example, if the first control module, control module No. 0, requires reconnection to the channel identified for purposes of completing an unsuppressible command, the bit at 150 would be turned on in buss-in. After completion of the poll at block 110, the director knows which of the four control modules attached need reconnection to this channel for both suppressible and unsuppressible reconnections. Knowing this information, the director can now poll the highest priority controller to determine which particular device actually needs to be reconnected to this particular channel. At block 112 of FIG. 2, the director issues a select controller and poll for device address command to determine which device address of the highest priority controller needs to be reconnected to the channel. FIG. 6A shows the bits on buss-out from the director to the control module that identifies the particular controller being polled. Since this poll is to determine which device needs to be reconnected to a channel, the DIR RECON bit at 174 of FIG. 6A will be set to 0, and the controller ID bits 170 and 172 will be set to a binary value to indicate which of the four controllers attached to the director is specifically being polled. The particular control module being polled will respond on buss-in with the particular device address as shown in FIG. 6B. Since up to sixteen devices can be attached to a particular control module, four binary bits 180, 182, 184, and 186 are used to identify which of the devices attached to the control module needs reconnection to the particular channel. At this particular point, the director now knows the particular control module and the particular device needing connection to the channel and it can complete the connection between the device and the CPU over the given path.

It is possible, because of timing considerations, that the connection between the device and the CPU has already been made by another director over another path before this director could complete the operation. Therefore, at block 114 of FIG. 2, the director must decide if a connection has been made. If a connection has been made, the director then moves to block 118 to process the data transfer between the device and the CPU. If no connection was made, because the device had been connected through some other path, the director moves to block 116 to determine if more controllers need access to this particular channel. If more controllers do need access to this particular channel, the controller moves to block 112 to poll the next highest priority controller and repeat the sequence. If no controllers need access to this particular channel, the director exits block 116 at the bottom and goes back to restart the polling loop at block 102.

If after completing block 106 of FIG. 2, no channels respond to the director's request, the director will exit block 108 and proceed to block 120 where it will poll the controllers to determine if any controller needs director only service, that is, status 4, special case reconnection to director only as defined earlier. At block 120, the director polls the control modules using the buss-out bits defined in FIG. 4A, wherein bit 142 DIR RECON is set to a 1 to indicate that the director is polling the control modules to determine if they need a director only reconnection. The control modules respond with the buss-in data from the control module to the director with bits as defined by FIG. 5. If controller 0 needs a director only reconnection, it will set the bit identified at 160 in FIG. 5. After completion of block 120, the director must determine whether any control modules need a director only response. If no control modules responded, the director will exit block 122 and go back to the top and restart the polling loop at block 102. If one or more controllers did respond as needing a director only reconnection, the director proceeds to block 124 to select the particular control module. At block 124, the director issues a select controller poll and places bits on buss-out as defined by FIG. 6A, wherein bit 174 DIR RECON will be set to a 1 to indicate that this poll is to determine director only reconnection, and bits 170 and 172 will be set to indicate the particular control module being polled. The control modules will respond on buss-in with bits as defined by FIG. 6B, wherein bits 180 to 184 will define the address of the particular device needing the director only reconnection, if any. At block 126 of FIG. 2, the director must decide whether any device needs a director only reconnection. If any device needs a director only reconnection, the director proceeds to block 118 to process the data from the particular device. If no device needed a director only reconnection from this particular controller, the director proceeds to block 128 to determine if other controllers need a director only reconnection. If other controllers did need a director only connection, the director proceeds to block 124 to select those controllers and process accordingly. If no other controllers needed a director only reconnection, the director proceeds to block 102 to restart the entire polling loop.

As shown by the above description, in this invention the director can poll all controllers at the same time to determine if any controller needs access to any of the channels attached to the director, whereas in the prior art each controller had to be polled individually. Furthermore, once a particular channel has been requested and that channel has responded to the director, the director can again poll all the controllers at one time to determine if any of them need access to the particular channel. This ability to poll all the control modules at one time, rather than polling each control module in sequence, significantly reduces the time required in the polling loop within the director. This reduction in time required to complete the polling sequence allows the director to reconnect a device to a CPU more often on the device's first attempt at a reconnection. Furthermore, since this polling time is significantly reduced, the director will have the ability to poll a larger number of devices, therefore allowing more devices to be connected to a given director, and allowing more total devices in the subsystem.

Further details associated with the present invention and the environment in which it is used may be found in the three Appendices listed below, each of which is incorporated herein by reference. These three Appendices may be found in the patent file and are identified as:

| Appendix | Title |
|---|---|
| I. | INTERRUPT PROCESSING USING ASSOCIATIVE RECONNECTION |
| II. | IBM CHANNEL SPECIFICATION |
| III. | DIRECTOR TO CONTROL MODULE INTERFACE SPECIFICATION |

Appendix I. is the applicants' invention disclosure, written by the applicants for the purpose of disclosing the invention to their employer, assignee of the application. As such, it may contain further insights and background information beyond what has been presented herein to aid those skilled in the art in making and using the invention. Appendices II. and III. represent interface and channel specifications associated with the preferred embodiment of the invention.

It is noted that while the hardware used with the invention has not been described in great detail, the actual hardware used is not critical to the operation of the invention. In fact, one of the advantages of the invention is that it can be used with a wide variety of hardware configurations, all of which hardware configurations are known and understood by those skilled in the art.

While the invention herein disclosed has been described by means of a specific embodiment and application thereof, numerous modifications and variations could be made thereto by those skilled in the art without departing from the spirit and scope of the present invention. It is therefore to be understood that within the scope of the appended claims, the invention may be practiced otherwise than as specifically described therein.

What is claimed is:

1. A method for reconnecting an I/O device to a predetermined CPU by way of a path in a system comprising a plurality of CPU's, a plurality of shared input/output (I/O) devices, and a plurality of paths for selectively coupling said CPU's to said I/O devices, each of said paths including a select combination of one of a plurality of channels selectively interconnecting said CPU's and one of a plurality of directors, one of a plurality of control modules, and a control module interface interconnecting each director and a control module in the respective path, and wherein each of said I/O devices is controllable and accessible by way of each of said control modules; said method comprising the steps of:
   (1) storing in each of said control modules the status of each of said I/O devices to indicate whether that device is ready to be reconnected to the CPU;
   (2) sending out in parallel a broadcast poll from one of said directors to all of said control modules coupled thereto, said broadcast poll arriving at each control module at approximately the same time, said broadcast poll requesting each control module to identify to the director each channel needed at that time to reconnect any of said I/O devices ready to be reconnected to the CPU;

(3) sending a response from each control module back to the director from which the broadcast poll originated, said broadcast poll response identifying each channel that is needed at that time to reconnect any I/O devices then ready to be reconnected to the CPU, said broadcast poll responses arriving at the director from said control modules connected thereto at substantially the same time;

(4) examining the responses received at the director in step (3) to determine those channels that are needed for reconnection of an I/O device, and sending a further poll to said control modules for the identification of each control module coupled to an I/O device that needs to be reconnected via a given one of said determined CPU channels;

(5) sending a response to said further poll from said control modules to the director identifying each control module connected to an I/O device that needs to be reconnected via said given channel and, in response thereto, sending a third poll from said director to a given one of said contol modules that need to be reconnected via said given channel for the identification of each I/O coupled thereto that needs to be reconnected via said given channel;

(6) sending a response back to the director from the given control module in response to the request made in step (5) identifying each I/O device connected thereto that needs to be reconnected via said given channel; and (7) connecting a device identified in step (5) to the CPU through said given channel.

2. A method of connecting a selected one of a plurality of I/O devices to a CPU through a selected path, said selected path including one of a plurality of channels originating at said CPU, a selected one of a plurality of directors connected to respective channels, a selected one of a plurality of control modules coupled to one of said directors through a control module interface, there being individual control module interfaces for coupling each director to each of a plurality of said control modules, and a device interface that connects the selected I/O device to said selected control module, said method comprising the steps of:

(1) storing in said control modules a status indication that includes a device connect ready signal from all I/O devices coupled thereto ready for connection to the CPU;

(2) simultaneously polling all control modules from one of said directors to determine if any control modules have I/O devices ready for connection;

(3) simultaneously receiving at said director a response to the poll of step (2) to identify which channels are needed to reconnect I/O devices ready for connection, and, in response thereto, polling said control modules from said one director to identify which of said control modules are connected to I/O devices that need to be reconnected via a given channel identified in this step (3);

(4) responding to said polling of step (3) by said control modules to identify control modules connected to I/O devices to be connected via said given channel, then individually interrogating each of said identified control modules identified in this step (4) to identify a specific device address to which a connection is to be made via said given channel, said interrogation being carried out under control of said one director; and (5) connecting the device at said specific device address to said CPU through said given channel, said connection being carried out under control of said one director.

3. The method of claim 2 wherein the response received in step (4) comprises a multiple bit digital word, selected bits of which are used to identify control modules having I/O devices ready for connection via said given channel.

4. The method of claim 3 wherein the responses received in step (3) are received on a common databuss of a buss-in port of the director, and wherein respective bits of the multiple bit digital words received on said databuss are interconnected with OR logic.

5. The method of claim 2 wherein the response received at the director in step (3) includes the following status indications:

(a) No reconnection or service required;
(b) Unsuppressible reconnection to one or more channels required; and
(c) Suppressible reconnection to one or more channels required.

* * * * *